(12) United States Patent
Wood

(10) Patent No.: US 6,804,607 B1
(45) Date of Patent: Oct. 12, 2004

(54) COLLISION AVOIDANCE SYSTEM AND METHOD UTILIZING VARIABLE SURVEILLANCE ENVELOPE

(76) Inventor: Derek Wood, 14602 NE. 169th St., Woodinville, WA (US) 98072

(*) Notice: Subject to any disclaimer, the term of this patent is extended or adjusted under 35 U.S.C. 154(b) by 0 days.

(21) Appl. No.: 10/125,918

(22) Filed: Apr. 17, 2002

Related U.S. Application Data

(60) Provisional application No. 60/284,545, filed on Apr. 17, 2001.

(51) Int. Cl.[7] .................................................. G01S 1/00
(52) U.S. Cl. ........................ 701/301; 180/167; 342/29; 340/425.5
(58) Field of Search ............................ 701/301, 23, 24; 180/167, 168, 169; 340/903, 425.5, 435, 436; 342/70

(56) References Cited

U.S. PATENT DOCUMENTS

| | | | | |
|---|---|---|---|---|
| 5,298,905 A | * | 3/1994 | Dahl | ........................... 342/54 |
| 5,818,355 A | * | 10/1998 | Shirai et al. | ................. 340/903 |
| 6,317,693 B2 | * | 11/2001 | Kodaka et al. | ............. 701/301 |

\* cited by examiner

*Primary Examiner*—Yonel Beaulieu
(74) *Attorney, Agent, or Firm*—Todd N. Hathaway

(57) ABSTRACT

A collision avoidance sense and avoid capability for an aircraft or other vehicle that monitors a sphere or other safety zone/cocoon about the vehicle. A light-detecting camera or other sensor receives a signal return if any object enters the safety cocoon. Once an object is detected in the cocoon, a signal is sent to the onboard sense and avoid computer and corrective action is taken. The system is capable of autonomous operation, and is self-contained and does not require additional hardware installations on target vehicles. The size and shape of the safety cocoon monitored by the sensors adjusts according to the speed and motion vectors of the aircraft or other vehicle, so as to maximize efficient use of sensor capabilities and minimize the size, cost and power requirements of the system.

17 Claims, 2 Drawing Sheets

COLLISION AVOIDANCE SYSTEM AND METHOD UTILIZING VARIABLE SURVEILLANCE ENVELOPE

This application claims benefit of U.S. provisional patent application No. 60/284,545 filed Apr. 17, 2001.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of SBIR Contract N98-150 awarded by the Department of Defense.

BACKGROUND a. Field of the Invention

This invention relates generally to collision avoidance systems and, more particularly to collision avoidance systems for aircraft and other forms of transportation, in which certain sensor parameters are variable depending on speed and attitude of the vehicle and other factors.

b. Description of Related Art

Due to its particular relevance to the emerging field of unmanned aircraft, the present invention will be described herein largely with reference to the exemplary applications of Unmanned Air Vehicles (UAV) and Unmanned Combat Air Vehicles. (UCAV). It will be understood, however, that the invention is equally suited to other vehicular applications such as manned aircraft, seagoing vessels, and road and rail vehicles, for example.

Operation of UAV's/UCAV's in the National Air Space (NAS) and/or Special Use Airspace (SUA) requires a collision avoidance system that meets Federal Aviation Administration (FAA) requirements for maimed aircraft. Since the UAV/UCAV is remote the operator does not have direct visual contact with the vehicle's surroundings, and in the absence of an effective automated sense and avoid system may not be able to avoid a collision with other aircraft or with terrain objects (e.g., buildings, power lines, trees and so on).

Presently, the collision avoidance system must provide at least the same level of capability as manned aircraft operating under Visual Flight Rules (VFR), as stated by the FAA. However, the skies are becoming increasingly congested so that relying on human eyesight for collision avoidance is no longer adequately reliable. In addition, the FAA has developed a strategic plan to improve safety that includes a goal of reducing U.S. aviation fatal accidents by 80 percent from 1996 levels by the year 2007. Consequently, a joint FAA/Industry Support Group, under the aegis of the Association for Unmanned Vehicle Systems International (AUVSI), has stated the need for solutions that address the concerns of both the UAV/UCAV industry and the FAA. The goal is an Advisory Circular (AC) that assures UAV/UCAV operations that meet the fundamental requirements of the FAA, but which do not unduly restrict UAV/UCAV operations in the NAS. As one means toward this end, Paragraph 8.(4)-(n) of a draft AC requires UAVs to be equipped with ". . . a means to 'see and avoid' equal to, or greater than, a manned aircraft."

Although all are agreed that increasingly capable sense and avoid systems are needed for UAV's/UCAV's, there are many practical factors that must be taken into account in order for such systems to be feasible. For example, the size, cost, efficiency and (sometimes) expendability that are key advantages of UAVs/UCAV's dictate that the use of systems that are reliable but also inexpensive, compact and lightweight.

Conventional collision avoidance systems used with manned aircraft do not offer truly satisfactory solutions for UAV's/UCAV's. In particular, conventional systems for avoiding air traffic collisions utilize Traffic Collision Avoidance System (TCAS) transponders or visual sensors that are excessively large, heavy, costly, complex and are in other respects unsuitable for most UAV's/UCAV's. For example, standard TCAS equipment is unable to interact with non-cooperating objects and typical low flying obstacles, such as birds, which may be invisible to the radar. In addition, the equipment is costly and, in most cases, exceeds the limited weight and size capabilities of most UAV's/UCAV's. Of course, while acute with UAC's/UCAV's, these are important concerns in the case of manned aircraft as well.

Methods that have been proposed to address these problem include the use of forward-facing mounted television cameras on the wings of the aircraft, as shown in U.S. Pat. Nos. 5,581,250, and 4,918,442. An inherent limitation of this type of system is the fact that it is based on an active light source, which is not passive/stealthy and is therefore unsuitable for many military applications. Furthermore, the monitored airspace is limited to the area directly in front of the aircraft. The systems disclosed in U.S. Pat. Nos. 4,755, 818 and 5,321,489 utilize laser beam technology but exhibit similar drawbacks, and also require that compatible equipment be installed on a second, cooperative aircraft in order for the aircraft to be detected by the system.

Accordingly, there exists a need for a sense and avoid collision avoidance system which is reliable and capable of autonomous or semiautonomous operation. Furthermore, there exists a need for such a system having a capability that meets and exceeds the capabilities of an aircraft operating under visual flight rules (VFR). Still further, there exists a need for such a system which is lightweight and compact, and which optimizes the employment of its sensors so as to maximize efficiency and minimize power and space requirements. Still further, there exists a need for such a system that is able to function using a minimum of active sensor transmissions, so as to be sufficiently passive/stealthy for military vehicles and related applications.

SUMMARY OF THE INVENTION

The present invention has been developed to address the specific problem of providing UAV's/UCAV's the same level of capability and reliability as a manned aircraft operating under VFR per FAA requirements within NAS and SUA. However, the invention is not limited to UAV's/UCAV's, as other applications exist for this invention such as the commercial airline industry, private aircraft, helicopters and ground and marine transportation to name but a few.

The system includes passive and active sensors and a control system designed to prevent mid-air and/or ground collisions. In addition to flight-path obstacles, this system performs other obstacle sensing operations such as detecting ground-based obstructions, undesirable weather and unmapped objects. The system is compatible with existing UAV/UCAV sensors and is able to detect non-cooperative targets. The system is also capable of functioning autonomously, and in a stealth mode if necessary.

In a preferred embodiment, the invention uses an infrared (IR) camera as the passive sensor and Light Detecting and Ranging (LIDAR) or Laser Detecting and Ranging (LADAR) as the active sensor to detect obstacles within a substantially 360° spheroid volume (envelope). The envelope extends about a centroid that is spaced from the aircraft by a distance and direction that is a function of the speed and direction of motion of the aircraft and the time required for executing a predetermined evasive maneuver. The size and shape of the envelope is consequently variable depending on the speed and attitude of the source aircraft and other factors, as by increasing/decreasing sensor power or output, or aligning threshold values, for example. Any object entering the envelope will generate data that is transmitted to the receiver, creating an autonomous unit not requiring installation of additional hardware on the target aircraft. Once the data is received, the collision avoidance computer is immediately informed that there is a hazard and a signal is sent to the autopilot or other autonomous control mechanism and a collision avoidance maneuver is executed.

The variable envelope enables the configuration of the sensors and/or the data processing to be adjusted for maximum efficiency. For example, the envelope may be adjusted to extend further ahead of the craft at higher speeds or to extend more downwardly for descending aircraft and more upwardly for ascending aircraft. Because sensor range/output is thus maximized in those directions that are most important based on the speed and attitude of the aircraft or other vehicle (e.g., in those directions presenting the highest closing rates), but not in other directions which are less important (e.g., those directions having slower closing rates), the complete system, including the power supply, can be lighter, more compact and less expensive as compared with a system that maintains an envelope at maximum range all about the vehicle at all times.

DETAILED DESCRIPTION a. Overview

The collision avoidance system of the present invention is an autonomous or semi- autonomous collision avoidance system based on the utilization of passive and/or active sensors.

Figure 1:
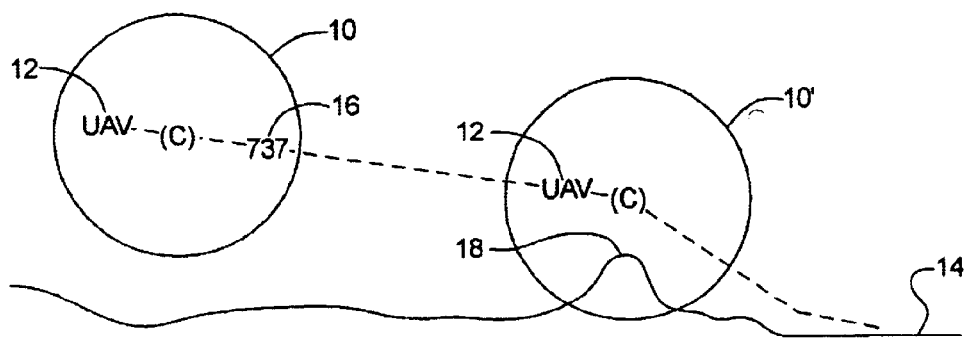
FIG. 1 is a schematic view depicting a vertical cross-section of a variable sensor envelope developed by a sense and avoid system in accordance with the present invention as carried on board an exemplary UAV, showing the manner which the system detects the ground and an aircraft along the path of the vehicle.

As can be seen in FIG. 1, a preferred embodiment of the invention employs fore- and aft-looking fisheye Charge Coupled Device (CCD) imagers to establish a 4n-steradian surveillance envelope 10 surrounding the source craft 12. The CCD imagers locate targets within the surveillance volume in terms of azimuth and elevation angles relative to the craft. An electronically scanned, eye-safe LADAR then measures targets range and range rate in a superimposed conical LADAR surveillance volume ahead of the air vehicle. The envelope has an adjustable configuration in terms of size and shape depending on the speed of the craft. At slow speeds, the envelope is more spherical while at high speeds it is more elongated with the aircraft towards the rear of the envelope. The envelope is formed around a centroid that is determined as a function of aircraft speed and direction, and the time (including system reaction time) required to initiate and execute one or more predetermined evasive maneuvers. Consequently, assuming a forward-moving craft, the centroid will be further ahead at higher speeds and closer to the aircraft at slower speeds.

For example, FIG. 1 shows the source craft as a UAV 12 approaching a runway 14 for landing. When the UAV is still distant from the runway and its speed is still high, the surveillance envelope 10 is formed more forwardly of the craft, i.e., with the UAV towards the rear of the envelope. In this manner, other aircraft located ahead of the UAV and therefore having high closing speeds are detected early, so as to ensure safe collision avoidance without radical maneuvering, In the example that is shown, a 737 passenger aircraft 16 is detected ahead of the UAV, just inside the envelope 10. Because the aircraft is detected early, the system is able to determine and implement a collision avoidance maneuver that involves minimal departure from the desired course, i.e., the approach to the runway; in this example, the collision avoidance computer simply reduces the airspeed of the UAV to keep the moving 737 just outside of the "safety cocoon." Although envelope 10 does not extend as far behind the UAV as it does forwardly, it is still sufficient to allow satisfactory avoidance of overtaking targets, due to their slower closing speeds. The system thus achieves maximum utilization of a sensor package of a given size and power.

Referring again to FIG. 1, as the UAV 12 nears the runway it slows in preparation for landing. Simultaneously, the envelope 10' shifts somewhat rearwardly around the UAV, i.e., the craft is positioned closer to the center of the envelope, to compensate for the reduced speed and look further behind the craft. The envelope may also shift downwardly based on the descent or downward aspect of the UAV to provide early detection of terrain. In the example which is shown in FIG. 1, a hilltop 18 is detected within the second envelope 10'; however, the system computer determines (based on the course and speed of the UAV, for example) that the hilltop is stationary and will pass outside of the "safety cocoon" on the current course; the system therefore maintains the course and speed of the UAV on its approach to the runway.

In short, a major benefit/advantage of the sense and avoid system of the present invention is the use of a variable envelope, tailored to the attitude and speed of the vehicle, for example, by adjusting scan areas, patterns or densities, by selective increases and decreases in sensor power or sensitivity, by adjusting sensor or software threshold values to focus more on a selected area, or by a combination of these and other means. This results in a smaller, lighter, lower cost and more efficient (lower energy usage) system.

Figure 2:
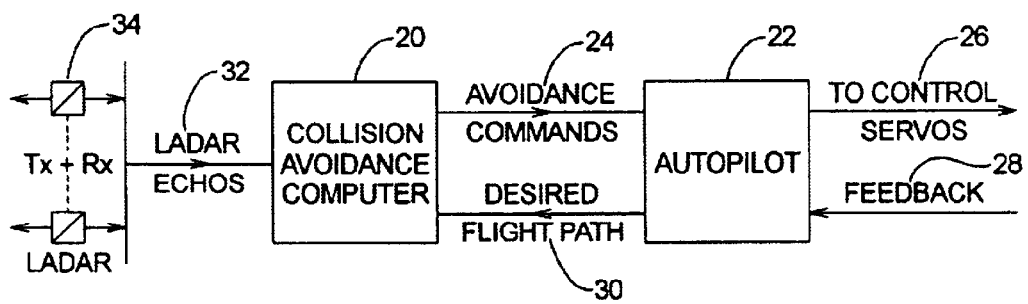
FIG. 2 is a flow diagram showing the data flow steps employed by the computer of the collision avoidance system of FIG. 1.

FIG. 2 illustrates operation the computer system of the preferred embodiment of the invention. As can be seen, this includes a collision avoidance computer 20, an autopilot 22, forward data flow 24 to the autopilot, forward data flow 26 to controls/servos, control/servo feedback 28 to the autopilot, and a feedback data flow 30 to the collision computer.

In an autonomous mode, when an object is encountered, the collision avoidance computer 20 is updated with data from the onboard autopilot 22 and determines the course/speed correction automatically. In a semi-autonomous mode, the collision avoidance computer 20 provides angular range and range rate data sets that are downlinked to a Ground Display Station (GDS) for processing to a) confirm that a threat is on a collision course with the air vehicle, b) determine the threat(UAV intercept point and time to intercept, c) suggest an appropriate anti-collision maneuver to the GDS UAV"pilot", and d) provide a visual display of the target.

Figure 3:
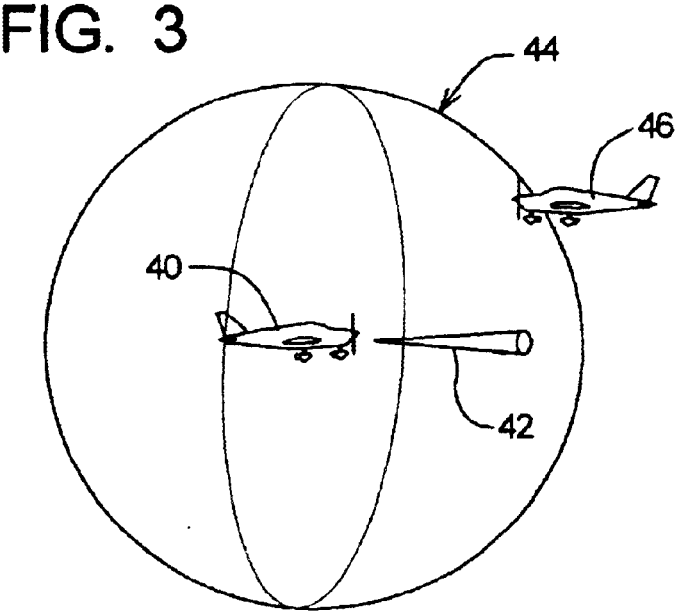
FIG. 3 is an enlarged view of the sensor envelope of FIG. 1, showing the complimentary use of a passive IR camera and active LADAR/LIDAR sensor.

With respect to the passive and active sensors, the preferred passive sensor is an infrared sensor, while the preferred active sensor is either Light Detecting and Ranging (LIDAR) or Laser Detecting and Ranging (LADAR) technology. The major components of the system are preferably configured to be insensitive to Electro-magnetic Interference (EMI) while mitigating the effects of friction and other non-linearities and providing high bandpass capability. Accordingly, FIG. 3 illustrates an example of an aircraft 40 having a safety envelope 44 as developed by a passive IR camera and a scanning LADAR beam 42, and the manner in which a non-cooperating aircraft entering the envelope becomes a system target.

Although the capabilities of the collision avoidance system of the present invention are perhaps most fully illustrated in the context of an Unmanned Air Vehicle (UAV) or Unmanned Air Combat Vehicle (UCAV), it will be understood, as noted above, that numerous other applications for the present invention exist in connection with other vehicles, such as commercial airliners, private planes, helicopters, watercraft, seagoing vessels, road and rail vehicles, and so on.

b. Sensors

The block diagram in FIG. 5 shows the principal hardware components of an example system having active/LADAR and passive/IR sensors. These include an imager 50, a LADAR sensor 52 and an onboard computer 54 having a suitable vision accelerator board 56. The arrows connecting the components show the principle data flows in the system as well as the data format between components. The bi-directional arrows between the computer (PC) and the Compass and LIDAR indicate that control (triggering) data flow over the RS-232 line to the device and data is received back from the device over the same serial name. The illustrated embodiment employs LADAR transmitter(s) that emit a LADAR signal surrounding the UAV in a variable envelope, however, it may be determined that LIDAR is better suited to certain applications.

The centroid of the envelope generated by the LADAR transmitters around the UAV searches further ahead at higher speeds as the UAV speed increases. Likewise, there are LADAR sensors that cover the same volume to detect any reflected LADAR signals. The LADAR sensor package is small enough to easily fit on existing and further UAVs. An example of a suitable small, lightweight diode laser transmitter as the Impulse XL industrial laser available from Laser Technology Inc., Englewood Colorado. This has a maximum range of 2.2 kilometers with an update rate of I Hz; the beam angular diameter is small, 3 milliradians and the native accuracy is A1 meter.

The LADAR detectors equate well to human eye capability, i.e. they detect well in Visual Meteorologic Conditions (VMC) but not in clouds. Technology permitting detection through cloud cover is available, however, and may be employed in certain embodiments of the invention.

The transmitters and receivers use laser technology, the pre-amps and the computer utilize electronic techniques, and the servos are preferably a combination of either electronic and electrical or electronic and hydraulic mechanisms; the type actuation selected will depend, in part, on application-specific design factors. The number of sensors, in turn, depends in part on whether the sensors are to be continuously rotated, either mechanically or electronically, or stationary. Exemplary directions and ranges to be covered by the sensors are as follows:

| a) | ahead |
|---|---|
| b) | astern |
| c) | below |
| d) | above |
| e) | left |
| f) | right |

Typical Maximum Range - 5 to 10 miles (VFR)

Typical Angular accuracy - down to $1 \times 10^{-5}$ radians

Typical Maximum cone angle - 60

Typical Maximum maneuver response time - 30 seconds (Based on a closing speed of 700 Knots).

Figure 4:
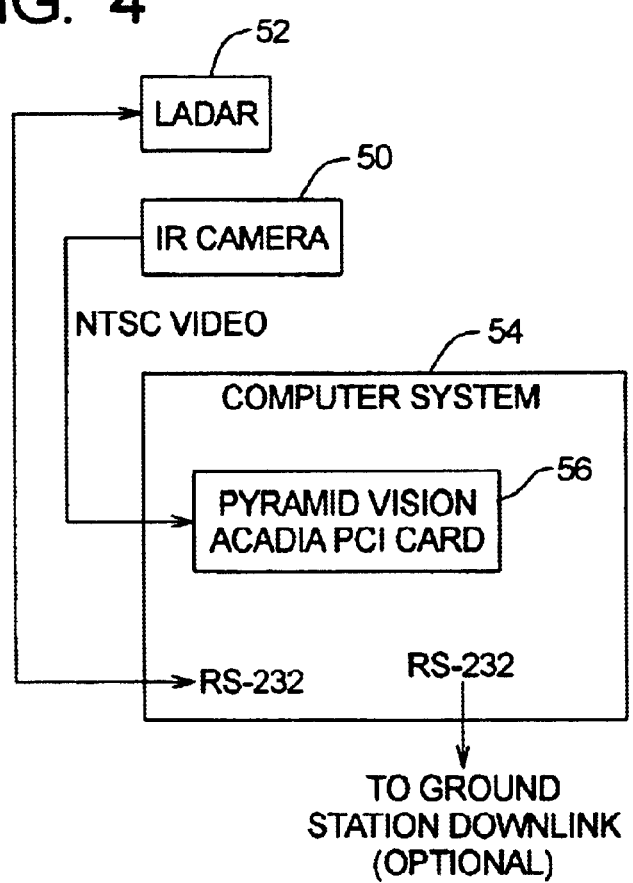
FIG. 4 is a block diagram of the sensor systems and their interface with the onboard computer of the collision avoidance system.

The imager subsystem, in turn, is composed of two cameras with wide angle, "fisheye" lenses, viewing the entire sphere around the UAV, although it will be understood that a smaller field of view (i.e., less than 360°) may be suitable for some applications. These imagers detect other aircraft, with the camera image sequence being fed directly to an on-board computer, allowing real time processing of the sequence, or optionally to a ground station with information about the location of the aircraft. This is schematically shown in FIG. 4, which shows the UAV 40 and ladar beam 42, as well as the images surveillance volume 44 and a non-cooperating aircraft 46.

The imager subsystem suitably employs a fixed, staring, wide field of view (FOV), mid-wave, infra-red camera, and processes the image data for airborne targets using their motion against the background as the principal discriminator. With this camera, targets (e.g. the exhaust manifold on a small airplane) are bright against a relatively uniform background. IR cameras of this type are available from Indigo Systems Inc. (Goleta, Calif.), such as Merlin-Mid camera this uses an InSb focal plane with 340×255 pixels and the noise equivalent delta temperature is about cameras, 0.025K.

Either fixed or gimbaled camera systems may be used: With a staring system, the cameras have wide fields of view, and commensurately large resolution angles (the angle subtended by a single pixel). Because a gimbaled system is scanned, it can have a much smaller instantaneous field of view, and thus much smaller resolution angles. In practice this means that an aircraft-sized contact at a range of several miles will be resolved by a gimbaled system, but may be less than a pixel across on a staring system. Thus a trade-off is made between the mechanical complexity of a gimbaled system and the processing/imager complexity of a staring system.

Image processing using motion as the discriminator is widely used. The example system accomplishes this for unresolved as well as resolved targets, using a suitable Digital Signal Processing board and software such as that available from Pyramid Vision, Inc. (Arlington. Va.).

The objective lens is a critical element of the IR camera. Lenses having a suitable field of view (FOV) are available from Diversified Optical Products (Salem. N.H.) The lens/ focal plane combination is preferably configured such that the pixel angular subtense, the angle viewed by an individual pixel, is the same as state-of-the-art (e.g., 1000×1000 pixel) cameras with 180 degree fields of view.

As can be seen in FIG. 5, the image processing system includes a computer system 54 (e.g., a PC), a Pyramid Vision Acadia PCI Vision card 56 or comparable vision accelerator board, and software written in C++(or other suitable language) that uses output from the Acadia card to produce a stabilized camera image for tracking targets. The Acadia PCI Vision System of the preferred embodiment is a PCI card powered by an 80 billion operations per second, high-performance digital signal processor. The Pyramid Vision system calculates the affine matrix stabilization of an NTSC video sequence in real time. The affine matrix is then used to register sequential images. When these sequential images are subtracted, moving objects appear as peaks against a suppressed background. Thresholding allows detecting motion of sub-pixel targets. Once the targets have been identified, a tracking algorithm is used to assure that each detected peak is a valid target, Tracking these targets over time minimizes false alarms and provides a 1 Hz update of target location.

c. Computer System

The system avoidance system of the preferred embodiment functions within three operating modes with respect to previously inputted desired values (e.g., previously inputted courses and speeds): (1) No danger—UAV proceeds per desired values, (2) Minor/medium collision avoidance needed—UAV makes mild maneuver to avoid collision, and (3) Major collision avoidance needed—UAV responds only to collision avoid inputs (ignores desired values).

The computer system is capable of operation in autonomous and semiautonomous modes, as will be described with reference to FIG. 2.

Autonomous Mode: The collision avoidance computer 20 receives threat information from the LADAR sensors 32. The autopilot 22 keeps the computer updated with course, altitude and speed inputs. When the computer determines that a deviation is needed, it sends this data to the autopilot 22. The autopilot 22 sends the updated commands to the control servos 26 thus implementing a collision avoidance maneuver to correct the craft's course, by changing roll, pitch, yaw and/or speed as appropriate.

Semi-autonomous Mode: In this mode, the system uses best available data supplied by the detectors/sensors to warn the pilot on the ground and suggest the specific maneuver needed to protect the UAV from a collision.

d. Controls and Servos

As noted above, the system utilizes a shifting centroid to adjust the envelope provided by the sensors. The centroid is preferably calculated by the onboard computer based on speed, course and altitude inputs from the aircraft, as well as predetermined times required for evasive maneuvers, such as a dive, climb or turn to avoid collision, including the reaction times of the computer and autopilot or other control system.

To ensure that the UAV adequately responds to the signal, the computer determines roll, pitch and thrust input signals that are fed to the UAV's control effectors and surfaces, given known specification for the controls and servos. This loop is closed back to the computer to ensure that the computer knows that its instruction or instructions have been satisfied. Some portion of these function may be performed using an existing or conventional autopilot mechanism; in such cases, and because a relatively high bandpass is needed, the autopilot mechanism may require modification in order to be compatible with the collision avoidance functions provided by the present invention.

e. Other Applications

As previously noted, the sense and avoid (collision) system of the present invention has additional applications in other aircraft, helicopters, watercraft, road vehicles, trains, and numerous other vehicles.

With respect to watercraft, the system is similar to that described above, with the exception that there may be two envelopes or"safety cocoons" instead of one: The first "cocoon" is envisioned as a generally hemispherical infrared surveillance zone for detecting surface and air contacts and obstacles, while the second"cocoon" would be a subsurface one provided by a sonar system. This second (sonar) "cocoon" keeps the vessel out of the way of submerged obstacles, whether moving or stationary, and in shallow water serves to keep the vessel from striking shoals and other natural obstacles.

The above-water and underwater sensors will monitor for continued safe passage and if an alert is detected in either above or below water cocoons, the computer will generate a safe course around the object. This is then communicated to the shipboard navigation system. Proposed speed or turn maneuvers would be communicated to the officer of the watch in the case of manned vessels, so that the officer of the watch or captain can implement a manual override if it is decided that the maneuver is unnecessary.

In addition to the safety aspects, it will also be possible to navigate the ship or other vessel in an autonomous or semiautonomous manner using the systems of the present invention to avoid contacts/obstacles both above and below the surface.

With respect to road vehicles, visual sensors may be utilized to monitor 60° forward/backward of the vehicle. When an object is detected in the monitored area, the system may flash the head and rear lights simultaneously or otherwise provide a visual or audible warning, and if no action is taken by the vehicle's driver, the anti-collision computer will generate and implement optimum braking and steering commands to avoid or minimize collision occurrence.

With respect to trains or other rail vehicles the system may also be similar to the aircraft configuration, however the sensors may be configured to monitor somewhat narrower zones, e.g., ±15° forward and ±15° behind the rear of the train. When an object is detected in the monitored area, the driver is provided with a visual and audio warning. If the warning is ignored, the anti-collision computer will automatically apply the brakes and/or engine power to slow the train. Furthermore, the system and may actuate a horn or other audible signal and energize bright warning lights on front and/or rear of train to warn the other vehicle or a person on the tracks.

Generally, for non-aviation applications the anti-collision system may be somewhat more rugged and heavier, and also somewhat less expensive than the aircraft versions.

It is to be recognized that various alterations, modifications, and/or additions may be introduced into the constructions and arrangements of parts described above without departing from the spirit or ambit of the present invention.

What is claimed is:

1. A method of collision avoidance for a vehicle, said method comprising the steps of:

determining a variable centroid, said centroid being spaced from said vehicle by a variable distance and direction that shifts as a function of the speed and direction of motion of said vehicle and a predetermined period of time required to analyze contact motion and execute an evasive maneuver, so that said centroid is adjusted forwardly away from said vehicle as a forward speed of said vehicle increases and rearwardly towards said vehicle as said forward speed decreases;

monitoring a volume around said centroid with at least one sensor so as to establish a surveillance envelope that substantially surrounds said vehicle;

adjusting said volume of said surveillance envelope as said centroid shifts with changes in the speed and direction of motion of said vehicles;

tracking movement of targets within said envelope with said at least one sensor so as to identify a target that is converging on said vehicle; and executing said evasive maneuver so as to avoid collision between said vehicle and said target converging thereon.

2. The method of claim 1, wherein the step of monitoring said volume around said centroid comprises the steps of:

monitoring said volume with a passive sensor; and measuring range to said targets with an active sensor.

3. The method of claim 2, wherein said passive sensor is an IR camera.

4. The method of claim 2, wherein said active sensor is LADAR.

5. The method of claim 2, wherein said active sensor is LIDAR.

6. The method of claim 1, wherein the step of executing said evasive maneuver comprises providing information on said converging contact to an autopilot for autonomous execution of said evasive maneuver.

7. The method of claim 1, wherein the step of executing said evasive maneuver comprises providing information on said converging contact to a ground station for remote piloting execution of said evasive maneuver.

8. A method of collision avoidance for a vehicle, said method comprising the steps of:

monitoring a volume around said vehicle with a passive sensor so as to establish a surveillance envelope that substantially surrounds said vehicle;

adjusting said volume of said surveillance envelope as a function of the speed and direction of motion of said vehicle;

tracking motion of targets within said envelope using said passive sensor so as to identify targets that are collision hazards to said vehicle;

scanning said collision hazards with an active sensor so as to determine a range to said collision hazards; and executing evasive maneuvers so at to avoid collision between said vehicle and said collision hazards.

9. The method of claim 8, wherein said passive sensor is an IR camera.

10. The method of claim 8, wherein said active sensor is LADAR.

11. The method of claim 8, wherein said active sensor is LIDAR.

12. A collision avoidance system for a vehicle, said system comprising:

a passive sensor for tracking motion of targets within a surveillance envelope that substantially surrounds said vehicle so as to identify targets that are collision hazards to said vehicle;

an active sensor for scanning said collision hazards within said surveillance envelope so as to determine ranges to said collision hazards;

means for adjusting a volume of said surveillance envelope as a function of the speed and direction of motion of said vehicle; and means for executing an evasive maneuver so as to avoid collision between said vehicle and said collision hazards.

13. The system of claim 12, wherein said passive sensor is an IR camera.

14. The system of claim 12, wherein said active sensor is LADAR.

15. The system of claim 12, wherein said active sensor is LIDAR.

16. The system of claim 12, wherein said means for executing an evasive maneuver is an autopilot for autonomous execution of said evasive maneuver.

17. The system of claim 12, wherein the means for executing an evasive maneuver is a ground station for remote piloting execution of said evasive maneuver.

* * * * *